G. BANKS & E. L. SEGER.
Clamps for Picture-Frames.
No. 149,425. Patented April 7, 1874.
Fig. 1.
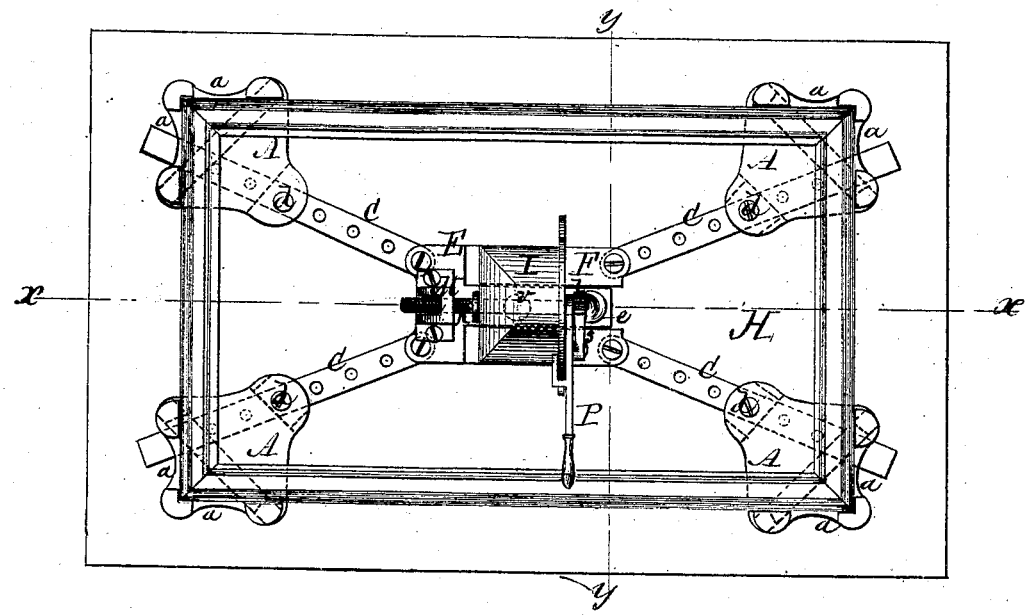
Fig. 2.
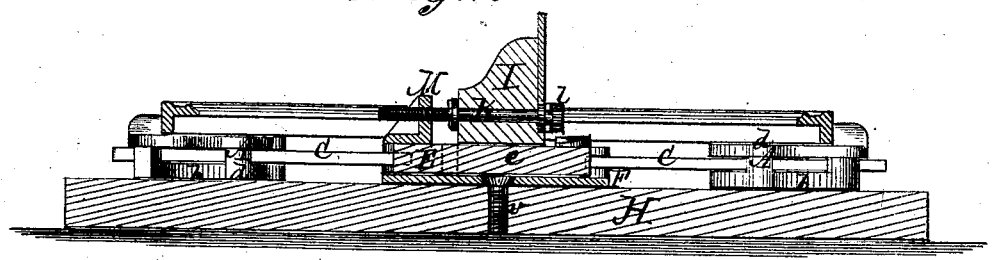
Fig. 3.
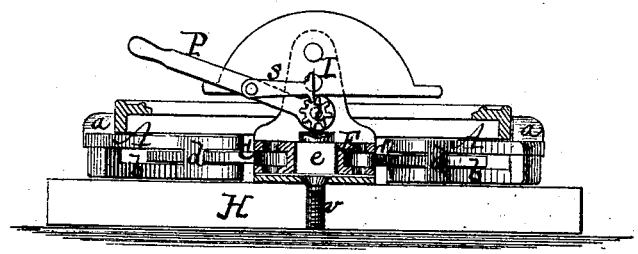
Fig. 4. Fig. 5.
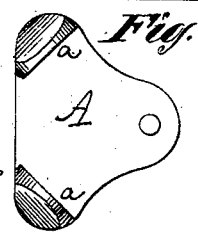
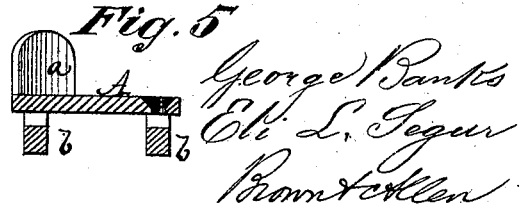
Witnesses:
John Becker
Fred. Haynes
George Banks
Eli L. Seger
Brown & Allen

UNITED STATES PATENT OFFICE.

GEORGE BANKS AND ELI L. SEGER, OF YONKERS, NEW YORK.

IMPROVEMENT IN CLAMPS FOR PICTURE-FRAMES.

Specification forming part of Letters Patent No. 149,425, dated April 7, 1874; application filed February 26, 1874.

*To all whom it may concern:*

Be it known that we, GEORGE BANKS and ELI L. SEGER, of Yonkers, in the county of Westchester and State of New York, have invented an Improved Clamp for Picture-Frames, of which the following is a specification:

Our invention relates to an apparatus for clamping the corners of picture and other frames while the joints are being secured, said apparatus being applicable to frames with mortise-and-tenon, miter, and other joints. The invention consists in the combination and arrangement of a series of shoes connected by rods or bars with a fixed center, toward which they are drawn simultaneously by means of a screw and lever, the shoes being arranged to clamp the corners of the frame, and being capable of adjustment to frames of different sizes, and the apparatus being either provided with a bed-plate or applicable to an ordinary carpenter's bench.

In the accompanying drawing, Figure 1 is a plan or top view of our invention. Fig. 2 is a longitudinal vertical section on the line $xx$ of Fig. 1. Fig. 3 is a transverse section taken in the line $yy$ of Fig. 1. Fig. 4 is a top view, showing a modification in the form of the shoe. Fig. 5 is a sectional view of the same.

The shoes A are formed with shoulders $a$ at right angles to each other and perpendicular to the plane of their travel, said shoulders being for the reception of the corners of the frame to be clamped. They may be closed at their points of junction, as shown in Fig. 1, to receive the corners of a frame which is formed with miter joints and fastened with glue alone, or they may be open at the portions corresponding with such points, as shown in Figs. 4 and 5, to allow the protrusion of the corners of the frame when they are formed with other than miter joints, or when they are to be fastened with nails or pins. On the under side of each shoe are blocks or bars $b$, which serve as bearings for the shoe, and also to brace and strengthen it, and are slotted to receive and allow free play to a rod or bar, C, which passes under the shoe, and in which are a series of perforations for the reception of a pivot, $d$, passing through the shoe A near the inner corner, whereby said shoe may be adjusted nearer to or farther from the center, as desired. The apparatus is provided with four of these shoes, one at each corner, connected by the rods C with a center block consisting of two parts, E F. The part E is formed with a tongue, $e$, which slides in a corresponding groove or recess in the part F, which is stationary, so far as longitudinal or lateral motion is concerned, but is pivoted so as to allow it to oscillate in a horizontal plane. It may be so arranged that its pivot $v$ may engage with a hole in an ordinary work-bench; or, if desired, it may be pivoted to a bed-plate, H, which bed-plate may be placed upon the bench when the apparatus is in use. On the upper side of the stationary part F of the center block is a standard, I, through which runs horizontally a screw-rod, K, on one end of which is a ratchet or toothed head, $l$. The threaded portion of the screw-rod K engages with a corresponding thread in a plate or nut, M, attached to the movable part E of the center block, so that said movable part is drawn toward or caused to recede from the stationary part F, according as the screw-rod is turned in one direction or another. To facilitate the turning of the screw-rod we employ a lever, P, to which is pivoted a pawl, $s$, which is reversible, to engage with the toothed head $l$ in either direction with equal facility. The frame is laid with its joints in the shoes A, as shown in the drawing, and is clamped between said shoes by moving the lever P so as to turn the screw-rod K in the proper direction to draw the movable part E toward the fixed part F, and thus draw all of the shoes simultaneously toward the center block, clamping them tightly and securing a perfect angle. The shoes may be adjusted to frames of different sizes by means of the pivots $d$ and their engagement with the perforations in the rods or bars C; and the shoes being pivoted to said rods they are free to adapt themselves to frames of different relative widths or lengths, the strain being uniform upon all of them. When the frames are formed with miter joints and fastened with glue alone, the shoes shown in Fig. 1 are used. When the frames are formed with mortise-and-tenon joints, or any other than miter joints, or are to be fastened with nails, pins, or wedges, the shoes shown in Figs. 4 and 5 are used, so as to allow the corners to protrude in order to manipulate them.

To provide for the effective clamping of frames having moldings on their outer surfaces, the shoes may be fitted with removable pieces adapted to fit the various forms of moldings.

What we claim as new, and desire to secure by Letters Patent, is—

1. The combination of the contracting and expanding center block E F, the shoes A, and the rods or bars C, connecting the shoes with the center block, the whole constructed and operating substantially as shown and described.

2. The combination of the lever and reversible pawl, the screw-rod K, the nut M, and the two parts E F of the center block, as shown and described, for the purpose specified.

GEORGE BANKS.
ELI L. SEGER.

Witnesses:
ALBERT KUHN,
ARNETT O. LAWRENCE.